UNITED STATES PATENT OFFICE.

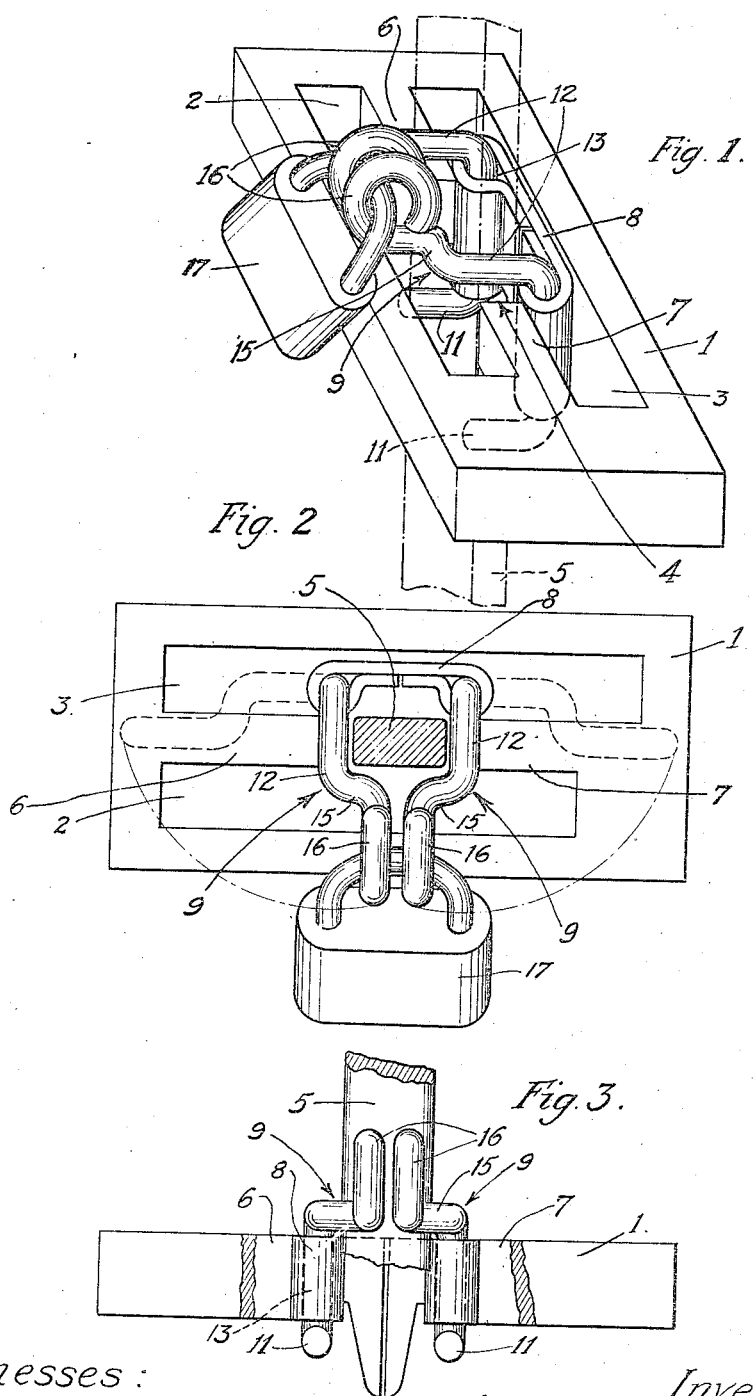

WILLIAM H. E. PENDLETON, OF VENICE, CALIFORNIA, ASSIGNOR OF ONE-THIRD TO EDWARD G. KUSTER AND ONE-THIRD TO RUSSELL B. CARTER, BOTH OF LOS ANGELES, CALIFORNIA.

LOCKING DEVICE FOR GEAR-SHIFT LEVERS OF AUTOMOBILES.

1,075,666. Specification of Letters Patent. Patented Oct. 14, 1913.

Application filed May 31, 1912. Serial No. 700,903.

*To all whom it may concern:*

Be it known that I, WILLIAM H. E. PENDLETON, a citizen of the United States, residing in the city of Venice, county of Los Angeles, and State of California, have invented a new and useful Locking Device for Gear-Shift Levers of Automobiles, of which the following is a specification.

This invention relates to a locking device applicable to the H-slot selective type of gear control with which the greater number of automobiles now on the market are equipped. By this invention a simple, efficient and inexpensive lock of the character stated is provided.

An object of the invention is so to construct the lock that it may readily be applied to various makes of cars having gear control of the H-slot type.

Other objects and advantages may hereinafter appear.

Referring to the accompanying drawings, which illustrate the invention, Figure 1 is an isometrical view of the slotted base plate or guide for the gear shift lever, showing the locking device in the operative position, the outline of the gear shift lever being indicated in dotted lines; Fig. 2 is a top plan view of Fig. 1 the gear shift lever being sectioned; Fig. 3 is a side elevation, one side of the slotted member being broken away, the gear shift lever being shown in full lines and the pad-lock being omitted.

Referring in detail to the drawings, the slotted member 1 is provided with the usual main guide slots 2 and 3 and the slot 4 (see Fig. 1) for holding the gear shift lever 5 in the neutral position. Said slot 4 divides the central bar into two sections 6 and 7.

The locking device proper includes a tie-plate 8 adapted for edgewise insertion into either of the main guide slots 2 or 3, said tie-plate being of somewhat greater length than the neutral slot 4. To each end of said tie-plate 8 is swiveled the hook portion of a hook-shaped link 9. Each of said links 9 is provided with a short arm 11 adapted to engage the lower edge of the middle bar when the device is in the operative position, and a main arm 12 adapted to engage the upper edge of said middle bar. Between the arms 11 and 12 each link is provided with a straight section 13 around which the tie-plate 8 is bent, said tie-plate being doubled over upon itself as shown.

The free ends of the arms 12 are provided with inbent portions 15 formed with eyes 16 to receive the padlock 17. When said padlock is in place, the links 9 and tie-plate 8 combine to embrace the central bar sections 6 and 7 together with gear shift lever 5, in such a way that it is impossible to move said lever from the neutral position.

The dotted lines of Fig. 2 indicate the position to which the links 9 are turned in order that the short arms or hooks 11 may be inserted into one of the main slots and hooked beneath the central bar.

The tie-plate 8 is provided with a central downward extension 18 (see Fig. 3) to guard against unauthorized persons tilting the locking device in such a manner as to move it out of operative position.

I claim:

1. The combination, with the slotted member of an H-slot type of gear shift, its central bar and the gear shift lever thereof, of a locking device having a tie-plate adapted for edgewise insertion into one of the main slots of the slotted member, said plate being of greater length than the neutral slot, and means carried by said plate to embrace at the same time both the central bar and the gear shift lever, and a lock to lock said means to hold said lever in the neutral position.

2. The combination, with the slotted member of an H-slot type of gear shift, its central bar and the gear shift lever thereof, of a locking device having a tie plate adapted for edgewise insertion into one of the main slots of the slotted member, said plate being of greater length than the neutral slot, means carried by said plate to embrace at the same time both the central bar and the gear shift lever, and a lock to lock said means to hold said lever in the neutral position, said plate having a downward extension to guard against the same being tilted out of the neutral position.

3. The combination, with the slotted member of an H-slot type of gear shift, its central bar and the gear shift lever thereof, of a locking device adapted to embrace said lever to hold the same in the neutral position, said locking device comprising a link and arms pivoted to said link to engage opposite sides of said central bar of said slotted member to retain said locking device in the operative position, said arms each having a straight central portion that forms a pivot, said link being adapted for edgewise insertion into one of the slots of the gear shift to prevent lateral movement of the locking lever toward that side when the locking device is in the operative position.

4. The combination, with the slotted member of an H-slot type of gear shift, its central bar and the gear shift lever thereof, a tie plate, two locking members each having an intermediate portion swiveled to one end of said tie-plate, each of said members having a locking arm, and a lock to secure said locking arms together against opposite sides of said gear shift lever, each of said locking members having also an arm adapted to underlie the central bar of an H-slot type of gear shift when the locking device is in the locked position.

In testimony whereof I have hereunto signed my name in the presence of two subscribing witnesses at Los Angeles, in the county of Los Angeles and State of California, this 25 day of May, 1912.

WILLIAM H. E. PENDLETON.

Witnesses:
 RUSSELL B. CARTER,
 ALBERT H. MERRILL.

Copies of this patent may be obtained for five cents each, by addressing the "Commissioner of Patents, Washington, D. C."